April 5, 1966 J. P. FOLEY 3,243,908

TELEPHONE INDEXING DEVICE

Filed Aug. 27, 1963 2 Sheets-Sheet 1

INVENTOR.
JAMES P. FOLEY

BY

Ward, Neal, Haselton, Orme & McElhannon
ATTORNEYS

April 5, 1966 | J. P. FOLEY | 3,243,908

TELEPHONE INDEXING DEVICE

Filed Aug. 27, 1963 | 2 Sheets-Sheet 2

INVENTOR.
JAMES P. FOLEY
BY
Ward, Neal, Haselton, Orme & McElhannon
ATTORNEYS 3,243,908
TELEPHONE INDEXING DEVICE
James P. Foley, 748 Forest Ave., Larchmont, N.Y.
Filed Aug. 27, 1963, Ser. No. 304,775
10 Claims. (Cl. 40—336)

The invention relates to improvements in telephone number filing devices of the type which may be attached to cradle-type telephones.

It is often desirable to have available in the vicinity of a telephone some sort of a conveniently accessible reference list of the more frequently called numbers. Preferably such a reference list should be indexed and should be more or less permanently attached to or near the telephone. Also it should be preserved in some protective arrangement.

One device for maintaining telephone number information in convenient and easily available reference form is described in U.S. Patent No. 2,990,639 to D. W. Van Gieson entitled Telephone Number Indexes. The indexing device described in the Van Gieson patent includes a drawer-type receptacle or slide member in which is contained numerous indexed sheets having names and numbers printed thereon in alphabetical or other ordered arrangement. The receptacle or slide member is held by means of a flat frame member to the underside of the telephone in a manner permitting it to be opened by sliding outwardly from between the front two legs of the telephone. The frame member in turn is provided with a stretchable cord attached thereto and which is looped over the rear legs of the telephone to hold the frame member in place.

Although the Van Gieson indexing apparatus has met with rather widespread commercial recognition, it has suffered from certain drawbacks inherent in the stretchable cord method of securing it to the telephone. Among the most important of these drawbacks are the high cost of production and the inconvenience in packing and shipping of large quantities of these items. The high cost of production results from the necessity for cutting precision slots in the frame member to hold the ends of the cord tightly and in proper location as well as from the cost of the elastic cord itself. These elastic cords also increase the bulkiness of the device so that shipment of large numbers of them becomes expensive.

According to one feature of the present invention there is provided a novel yet extremely simple and inexpensive telephone number filing device which may be easily and securely attached to the underside of standard cradle-type telephones. According to another feature of the invention, this novel device requires no intricate locking or fastening devices for attachment to the telephone, nor does it require special springs or resilient elements. The present device may be made with a self attaching frame member of simple unitary construction and may be flattened without harm for easy packing.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

A specific embodiment of the invention has been chosen for purposes of illustration and description, and is shown in the accompanying drawings, forming a part of the specification, wherein.

Figures 1, 2, 3, 4, 7, 8:
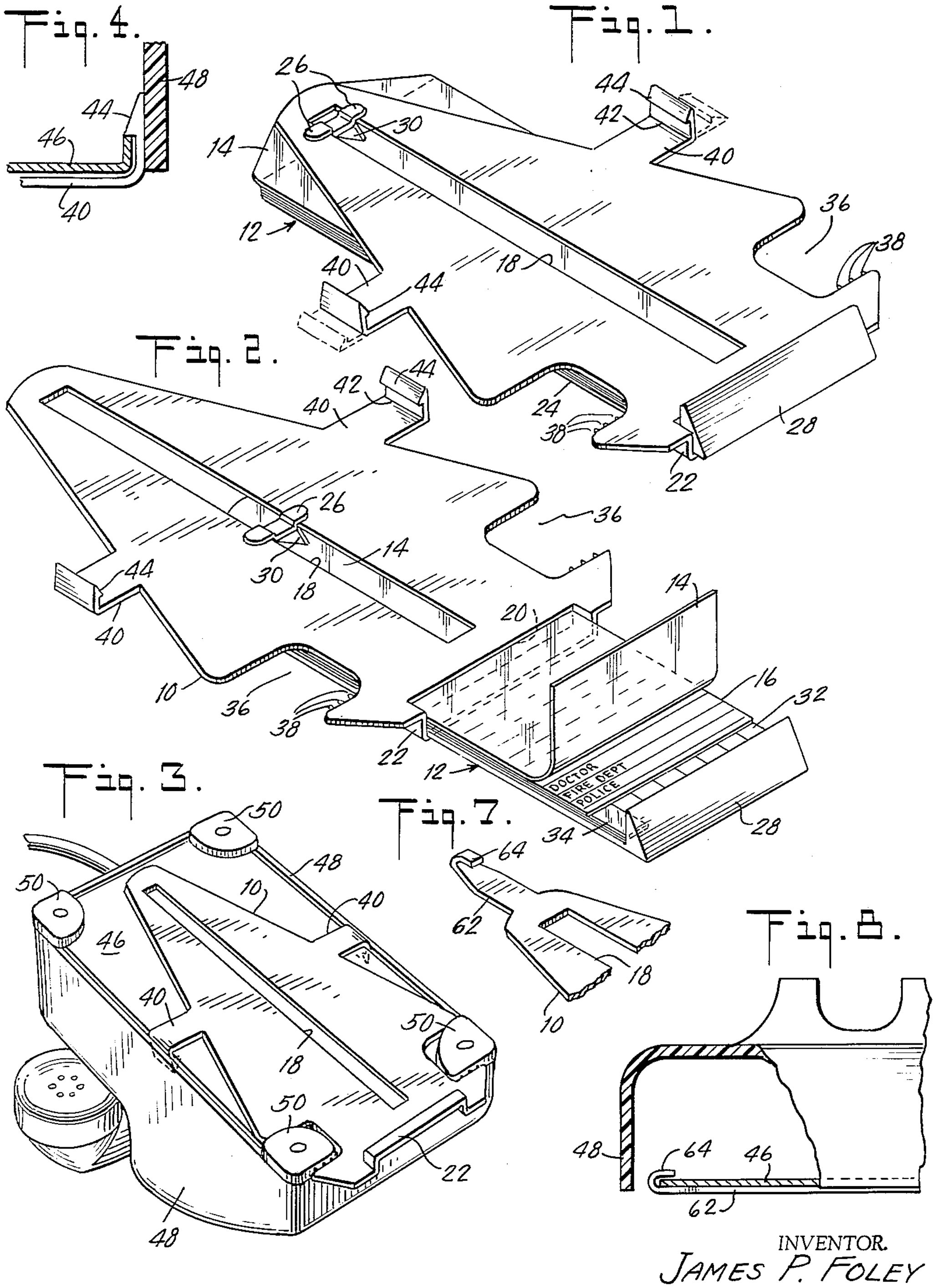
FIG. 1 is a perspective view of a telephone number indexing apparatus incorporating the principles of the present invention and shown in its closed position.
FIG. 2 is a perspective view of the apparatus of FIG.1 shown in its opened position.
FIG. 3 is a perspective view illustrating the manner of engagement of the apparatus of FIGS. 1 and 2 with a telephone.
FIG. 4 is a fragmentary section view taken along line 4—4 of FIG. 3.
FIG. 7 is a fragmentary perspective view illustrating a further modification of a portion of the apparatus shown in FIGS. 1, 2 and 3.
FIG. 8 is a fragmentary section view illustrating the modified portion of FIG. 7 in assembly.

As shown in FIGS. 1 and 2 of the drawings, the illustrative embodiment includes a frame member 10, a receptacle or slide member 12, an overlay sheet 14, and index material 16. The frame member and the slide member can be formed of any rigid or semi-rigid material such as light gauge sheet plastic, fiber or other suitable material. The overlay sheet can be formed of plastic or other suitable material, but should be transparent and of sufficiently light gauge to have the flexibility of ordinary sheet paper. The index material may be sheets of light weight paper ruled and alphabetically indexed.

The frame member 10 is provided with a centrally disposed longitudinally extending slot 18 which serves as a guide for the slide member 12. A transversely extending slot 20 is also provided on the frame member in close proximity with its front edge. The portion of the frame member between the transversely extending slot and the front edge is depressed to form a front cradle 22 which supports the slide member 12.

The slide member comprises a flat floor portion 24 which fits loosely within the transverse slot 20 on the frame member and upon which rests the index material 16. The rear portion of the slide member is provided with a pair of centrally located tongues 26 which extend upwardly from the floor portion and are bent to lap over the sides of the longitudinal slot in the frame member. These tongues effect a loose interlock between the slide and frame members which permits the slide member to be guided and held by the frame member when it is withdrawn therefrom. The tongues 26 of the slide member may be bent to their overlapping position prior to assembly and may be inserted into the longitudinal slot of the frame member simply by flexing and temporarily spreading the slot for such reception. The forward or pull-out end of the slide member floor portion 24 is bent or molded into angular formation to provide a handle 28 for withdrawing the slide member to an exposed position and for restoring it to its normally concealed position under the frame member.

The index material 16 consists of a stack of indexed paper sheets which rest on the floor portion 24 of the slide member between the tongues 26 and the pullout handle 28 of the member. These sheets are not affixed to the slide member and thus may be withdrawn or replaced without having to remove or disassemble the slide member from the frame member. The overlay sheet 14, however, is preferably affixed to the slide member since it carries no information and serves primarily to protect the index material. By affixing the overlay sheet to the slide member the removable index material is better held in place within the slide member. A triangularly shaped slot 30 is provided at the rear of the overlay sheet for insertion of tongues 26 of the slide member prior to assembly of the slide member with the frame member.

The front edge of each of the removable index sheets is shaped to form an index tab 32, the tabs of the various sheets being progressively wider for the sheets nearer the bottom of the stack. Thus, a portion of the tab on each sheet is exposed immediately upon opening of the slide member 12. These exposed portions may be alphabetically indexed so that the sheet containing a desired name may be referred to immediately.

The sheet immediately under the transparent overlay sheet is also made removable; but instead of containing information in the usual catalogued arrangement, this sheet contains the more frequently called numbers as well as emergency numbers. Because this sheet is immediately under the transparent overlay sheet 14, the information on it is readily at hand immediately on withdrawal of the slide member. The information on this "quick reference" sheet, however, is generally changed even more often than the regularly catalogued information on the other sheets. Consequently, this sheet also should be made removable and thus should rest unattachedly with the other sheets in the slide member. However, this sheet must allow access to the indexed tabs on the front of the other sheets and consequently is made shorter than these sheets. In order to prevent the unattached shorter quick reference sheet from sliding up over and obscuring the indexed tabs there is provided a transparent tab 34 equal in length to the tabs on the other sheets, this transparent tab being attached to the front edge of the quick reference sheet and abutting the handle 28 on the slide member to hold the quick reference sheet in position while at the same time permitting the other tabs thereunder to be viewed.

As in the aforementioned Van Gieson indexing arrangement, the frame member of the present device is provided with a pair of cut-out portions 36 near its front edge, these cut-out portions being shaped and arranged to engage the front legs 50 of a telephone (FIG. 3), so as to maintain lateral and longitudinal positioning of the frame member under a telephone base. The cut-out portions 36 in the present case, however, are provided with a series of small tooth like projections 38 extending rearwardly from along the front edges. These tooth like projections engage the telephone along the line where the front legs meet the cover so that when the frame member assembled in position against the base of the telephone these projections serve to lock the front portion of the frame member in place.

A pair of tab like projections or extended arms 40 project out from the sides of the frame member at points approximately halfway between the front indentations 36 and back edge of the member. The extended arms are bent or are bendable upwardly about certain preselected bend lines 42 which are parallel to the longitudinal slot 18 in the frame member. The bend lines are mutually displaced by an amount equal to the width of the base of an ordinary telephone, a distance of approximately five inches. There are also provided barbs 44 on the upper surface of the tips of the extended arms which hook over the edges of the base element of a telephone when the frame member is assembled therewith. The tips of the arms have a thickness of approximately one eighth of an inch, or an amount sufficient to produce a force fit when inserted between the cover and the base of an ordinary telephone.

The manner in which the extended arms on the frame member act to hold the frame member flatly against the undersurface of a telephone is best shown in FIGURES 3 and 4. A conventional telephone, as shown inverted in FIG. 3, includes a sheet metal base 46 upon which are mounted the operative components of the telephone, and further includes a plastic cover 48 which fits down over these components and surrounds the base leaving a narrow peripheral slot or gap therebetween. Four rather short legs 50 are attached to the base at the corners of the telephone. The frame member is assembled by fitting its cut-out portions 36 around the front legs of the telephone so that the toothed projections 38 insert themselves between the legs 50 and the cover 48. The upwardly bent portions of hte arms 40 on the frame member 10 fit into the slots between the base and the plastic outer cover 48 of the telephone. As can be seen most clearly in FIG. 4, the outer cover 48 of the telephone forces the barbed tips 44 of the arms inwardly so that they hook onto the upwardly bent edge of the telephone base 46. Since the outer cover of a telephone is made of plastic, and therefore is resiliently flexible, the barbed region of the extended arms ahead of the barb is externally tapered so that upon pushing it between the telephone cover and the base cover it is forced outwardly until the barb passes the edge of the telephone base whereupon the cover springs back to hold the barb in semi-permanent engagement with the base.

If desired the extended arms 40 may be bent upwardly in permanent fashion as shown in FIGS. 2 and 4. However, in certain circumstances such upwardly bent extending arms present an obstacle to shipping and packing, particularly when dealing with a great quantity of these items. In such circumstances it may be preferable to make the frame member completely flat so that the extended arms protrude only outwardly as shown in the dotted line configuration of FIG. 1. Then when the device is put into assembly with the telephone, the tips of the arms may be bent upwardly about their preselected bend lines 42 which, depending upon the materials used, may be precreased or prescored.

It will be appreciated by those skilled in the art that the extended arms 40 need have no special characteristics such as resiliency, and in fact, are preferably nonresilient so that when forced into the slots between the telephone base and the outer cover, they cause the outer cover to spring outwardly whereby they are held to the telephone. The frame member thus may simply be formed of inexpensive material with the extended arms 40 integrally attached.

Figure 5:
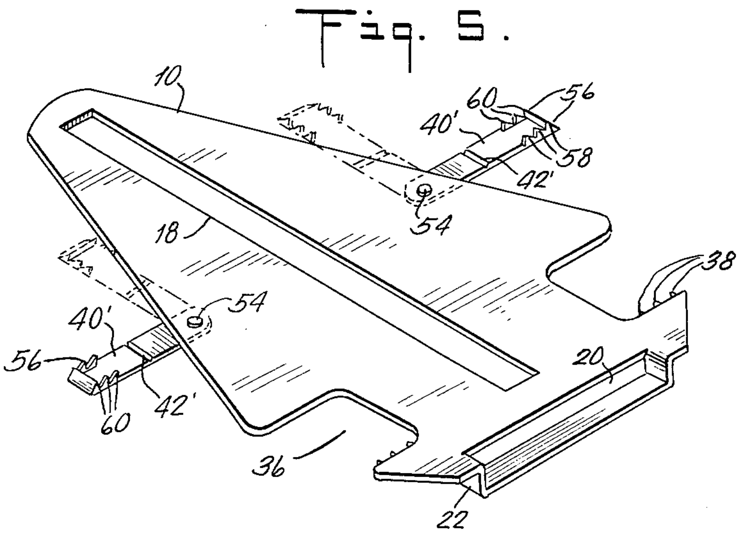
FIG. 5 is a perspective view illustrating a modification of a portion of the apparatus shown in FIGS. 1, 2 and 3.
Figure 6:
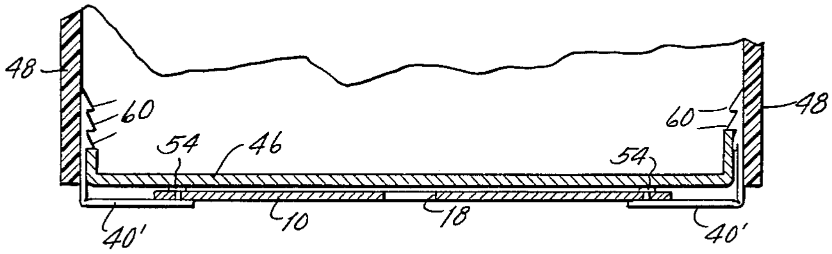
FIG. 6 is a fragmentary section view illustrating the modification of FIG. 5 in assembly.

It is of course not necessary that the extended arms 40 be integral with the frame member 10. A variation having separate and mechanically attached extended arms 40′ is shown in FIGS. 5 and 6. These separate arms are approximately of the same thickness as the frame member and are attached thereto by means of rivet type projections 54 which extend through holes provided near the edges of the frame member. It will be noted, as shown in FIG. 5, that the extended arms 40′ are grooved along fold lines 42′ so that they may be left flat for shipment and storage and then folded up easily and accurately for proper engagement with a telephone base. These separately attached extended arms are preferably made of a flexible polymeric substance such as polypropylene or polyethylene, which are noted for toughness and resistance to fatigue under severe and extensive bending. The strength of this material also makes it possible to provide a rivet type attachment to the frame member so that the extended arms may be folded back along the frame member (as shown in the dotted lines) for compactness in shipping and storage.

The extended arms 40′ of the modified embodiment shown in FIGS. 5 and 6 are provided near their tips with ridges 56 which extend longitudinally along either side thereof. These ridges are provided with notches 58 which in effect form a series of barbs 60 at different levels above the fold line 42′ so that the apparatus may be attached snugly to the base of a telephone irrespective of the amount of upward bend in the telephone base element to which the device is attached.

In certain situations, it may be desired to provide additional support from a point near the rear of the frame member. Means for accomplishing this may take the form of an additional extended arm similar to the arms 40 of the embodiments described, this latter arm extending from the rear of the frame member 10.

There are in existence telephones having base elements which are not bent upwardly about their periphery but which rather lie entirely flat. In such cases the extended arms 40 would be provided with barbed portions 44 which extend above the fold line 42 by an amount equal only to the thickness of the base element. Also, in such cases rear support would be provided as shown in FIGS. 7 and 8 wherein the frame member 10 includes a rearwardly extending arm 62 with an upwardly and reversely bent tip 64 which hooks over the rear edge of the telephone base element. This hooked tip may or may not be constructed to cause outward bending of the telephone cover during assembly, its most important function being to hold the rear portion of the frame member snugly up against the telephone base and to prevent forward movement of the frame member.

Having thus described my invention with particular reference to the preferred forms thereof, it will be obvious to those skilled in the art to which the invention pertains, after understanding my invention, that various other changes and modifications may be made therein without departing from the spirit and scope of my invention, as defined by the claims appended thereto.

What is claimed as new and desired to be secured by Letters Patent is:

1. An index arrangement for use with telephones of the type which have a base element and a flexible resilient cover piece which extends down over and around the periphery of said base element to form narrow slots therebetween, said index arrangement comprising a thin elongated drawer like slide member adapted to carry index sheets, a generally flat frame member constructed to support said slide member along the undersurface of said frame member in drawer sliding manner therewith, and at least one tab like projection extending from the edges of said frame member, the tip of said tab like projection having a barbed tip configuration, said barbed tip configuration comprising a step-like formation near the tip of the projection, said step-like formation defining a hooking surface which extends up from the projection for engaging the edge of a telephone base element, said step-like formation also constituting an increase in the thickness of said projection beyond said hooking surface whereby upon insertion of said tip into said slot said plastic cover is sprung outwardly and returns to normal position holding the barbed tip of said tab like projection in hooking engagement with the edge of said base element.

2. The apparatus described in claim 1 wherein the external configuration of said tip is tapered to promote forcing outwardly of said cover upon insertion of said tip into said narrow slot.

3. An index arrangement for use with telephones of the type which have a base element and a plastic cover piece which extends down over and around the periphery of said base element to form narrow slots therebetween, said index arrangement comprising a thin elongated drawer like slide member adapted to carry index sheets, a generally flat frame member constructed to support said slide member along the undersurface of said frame member in drawer sliding manner therewith, and a plurality of tab like projections extending from the edges of said frame member said tab like projections having hook like tips capable of entering into said narrow slots and engaging with the edges of said base element for holding said frame member against said base element, each of said hook-like tips comprising a step-like formation on one of said tab-like projections and defining a hooking surface which extends up from the projection for hooking over the edge of a telephone base element, said step-like formation also constituting an increase in the thickness of said projection beyond said hooking surface, the thickness of said formation being slightly greater than the width of said slots whereby said plastic cover piece maintains said hook like tips in engagement with said base element.

4. An index arrangement for use with telephones of the type which have a base element and a flexible resilient cover piece which extends down over and around the periphery of said base element to form narrow slots therebetween, said index arrangement comprising means adapted to carry index sheets, a generally flat frame member constructed to support said index sheet carrying means, a pair of elongated tab like projections each connected at one end to a point near opposite edges of said frame member, each of said tab-like projections having a barbed tip configuration comprising a step-like formation near the tip of the projection, each said step-like formation defining a hooking surface which extends up from the projection to hook over the edge of said base element, the thickness of said step-like formation constituting an increase in thickness to permit said barbed tip configuration to enter into said narrow slots and to be forced by said plastic cover piece into engagement with said base element for holding said frame member against said base element.

5. An index arrangement for use with telephones of the type which have a base element and a flexible resilient cover piece which extends down over and around the periphery of said base element to form narrow slots therebetween, said index arrangement comprising a thin elongated drawer like slide member adapted to carry index sheets, a generally flat frame member constructed to support said slide member along the undersurface of said frame member in drawer sliding manner therewith, and a pair of elongated tab like projections each pivotally connected at one end to points near the side edges of said frame member and swingable in the plane of said frame member, the other end of each of said elongated tab-like projections being provided with a barbed tip configuration on its upper surface, said barbed tip configuration comprising a step-like formation near the tip of the projection, said step-like formation defining a hooking surface which extends up from the projection surface to hook over the edge of a telephone base element, said step-like formation further constituting an increase in the thickness of said projection beyond said hooking surface, said elongated tab like projections being upwardly bendable about grooved bend lines thereon to hook over the edges of said base element for holding said frame member against said base element.

6. The apparatus described in claim 4 wherein the tip portion of said tab like projections is formed with a series of barbs along the length of said tab like projections.

7. The apparatus described in claim 6 wherein the tips of said tab like projections are formed with ridges extending longitudinally along opposite edges of the tips of said tab like projections on one side thereof and notched to form barbs thereon for engagement with the edges of said base element.

8. The apparatus described in claim 4 wherein said elongated tab like projections are formed of a flexible polymeric substance and are grooved along preselected bend lines.

9. In an index arrangement for use with telephones of the type having a base element and a flexible resilient cover piece which extends down over and around the periphery of said base element to form narrow slots therebetween, the combination comprising, a generally flat frame member constructed to support index sheets carrying means under such telephone, and at least one tab like projection extending from the edges of said frame member, the tip of each said tab like projection having a barbed tip configuration, said barbed tip configuration comprising a step-like formation near the tip of the projection, said step-like formation defining a hooking surface which extends up from the projection for engaging the edge of a telephone base element, said step-like formation also constituting an increase in the thickness of said projection beyond said hooking means, whereby upon insertion of said tip into said slot said plastic cover is sprung outwardly and returns to normal position holding the barbed tip of said tab like projection in hooking engagement with the edge of said base element.

10. The combination set forth in claim 9 wherein said tip is tapered beyond said step like formation to promote forcing outwardly of said cover upon insertion of said tip into said narrow slot.

References Cited by the Examiner

UNITED STATES PATENTS

| | | | |
|---|---|---|---|
| 2,432,760 | 12/1947 | Higbee | 40—336 X |
| 2,592,066 | 4/1952 | Pratt | 281—11 |
| 2,990,639 | 7/1961 | Van Gieson | 40—336 |

EUGENE R. CAPOZIO, *Primary Examiner.*

JEROME SCHNALL, *Examiner.*